J. C. MEISTER & J. A. COCHRAN.
DAMPER CLIP.
APPLICATION FILED FEB. 7, 1908.
906,254.
Patented Dec. 8, 1908.
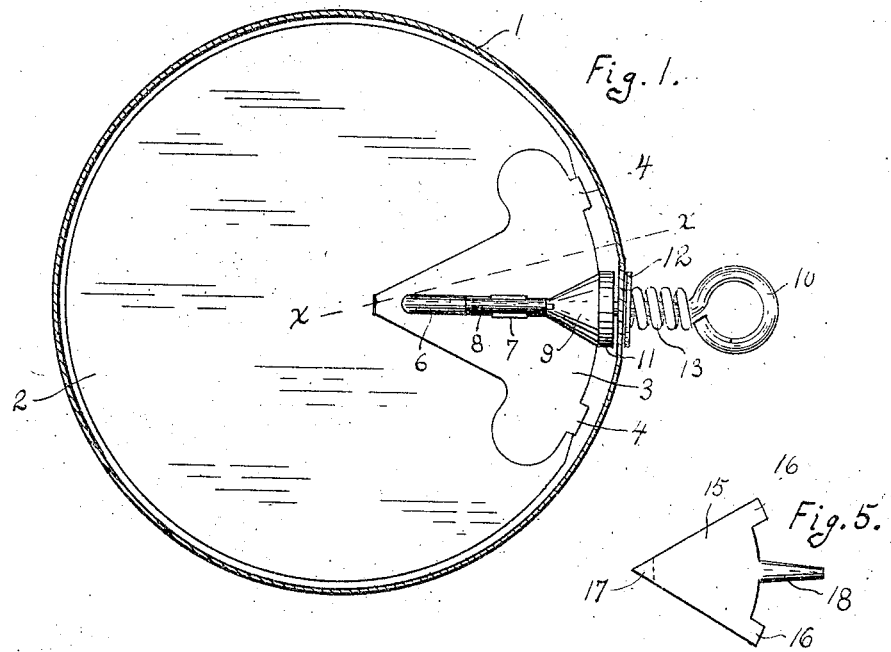
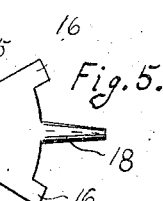
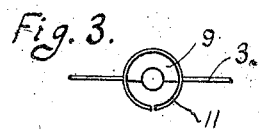
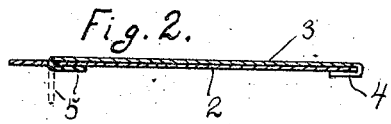
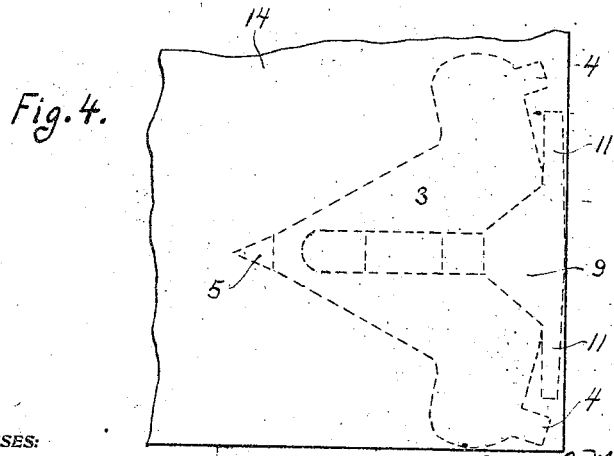
WITNESSES:
Millard Haskell.
A. K. Habirer
INVENTORS
John C. Meister and
John A. Cochran,
BY Walter N. Haskell,
their ATTORNEY

UNITED STATES PATENT OFFICE.

JOHN C. MEISTER AND JOHN A. COCHRAN, OF STERLING, ILLINOIS.

DAMPER-CLIP.

No. 906,254.  Specification of Letters Patent.  Patented Dec. 8, 1908.

Application filed February 7, 1908. Serial No. 414,808.

*To all whom it may concern:*

Be it known that we, JOHN C. MEISTER and JOHN A. COCHRAN, citizens of the United States, residing at Sterling, in the county of Whiteside and State of Illinois, have invented certain new and useful Improvements in Damper-Clips; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has reference to damper clips, and aims to provide a simple device of that class which can be quickly attached to the damper, and without the use of any securing means outside of itself.

In the installation of a furnace, wherein the pipes are of comparatively large size, such pipes are usually provided with dampers by cutting a sheet metal disk of suitable size, and securing to one edge thereof a clip, in which is held a detachable handle. In the larger sizes of dampers the edge thereof opposite to the clip is also provided with a small plate, with an outwardly extending point, or "tail-piece", to aid in holding the damper in position, transversely of the pipe. The customary method of securing the clip to the damper has been to furnish such damper and clip with corresponding perforations, and uniting them with pins or rivets passing through such perforations.

One of the purposes of our invention is to do away with the use of the rivets, or other supplemental means, resulting in a considerable saving both in material and time.

In the drawings: Figure 1 is a plan view of a damper embodying our invention, as it appears in position in the pipe. Fig. 2 is a cross-section in the line $x$—$x$ of Fig. 1. Fig. 3 is an end view, showing the circular shoulder 11. Fig. 4 is a diagrammatic view, showing one method by which our invention can be produced. Fig. 5 is a detail, showing a tail-piece, similarly constructed to the clip.

1 represents the usual pipe, 2 the damper therein, and 3 the clip secured thereto. At its outer edge the clip 3 is provided with a pair of ears 4, bent downwardly, and adapted to engage the edge of the damper, and at its inner end the clip is provided with a point 5, also bent downwardly, and adapted to be forced through the damper, as shown in Fig. 2.

The clip is centrally provided with keepers 6 and 7, in which is held the inner end of a handle 8, which is detachably secured in the enlarged portion 9 of the clip 3. The handle 8 passes through the pipe 1 and is provided on its outer end with a ring 10, or similar operating means. The means for operating the clip and damper attached thereto are not considered to be novel, and no claim is made thereon.

At its outer edge the clip is provided with a circular collar, or shoulder 11, adapted to rest against the inner face of the pipe 1, the handle 8 passing through the center thereof. On the outside of the pipe, adjacent to the collar 11 is a circular plate 12, held in contact with the pipe by means of a coiled spring 13, on the handle 8. The collar 11 is thus held in close contact with the pipe, and aids in holding the clip and damper in a proper position, at right angles to the pipe.

In using the clip, the ears 4 are first bent into position for use, and the point 5 turned at right angles to the clip, on the same side thereof as the ears. The damper is then slipped beneath the ears, and the point 5 driven through the damper, and clenched on the lower side thereof. It is preferred to form the clip 3 of sheet-metal of considerable strength, such as steel, and the point 5 can be readily driven through the damper, which is ordinarily formed of tin, or similar light material.

In Fig. 4 is shown a piece of metal 14, out of which the clip 3 and parts integral therewith can be cut, as shown by broken lines thereon.

In Fig. 5 is shown a plate 15, provided with a pair of ears 16 at its outer edge, similar to the ears 4, and a point 17 at its inner edge, similar to the point 5. The plate is also provided with a point 18, adapted to be held in the pipe at a point opposite to the handle 8. The ears 14 can be caused to engage the edge of the damper, similarly to the ears 4 and the point 17 turned at right angles and forced through the damper, and secured thereto.

In devices of this kind it is necessary to have the center line of the clip in line with the center of the damper, so that the latter will turn freely in the pipe, and it has been found necessary to locate the center of the damper, by measurements, and locate the clip with reference thereto. In our invention, the ears 4 are equi-distant from the central line of the clip, and from the point 5, so that the clip is self-centering, and no measurements are required. Whenever the ears are in position on the edge of the damper the point is on a line with the center thereof.

As compared with the use of rivets, hereinbefore referred to, the advantages of our device are apparent, not only in the saving of material which is thereby secured, but also through the saving of time which has heretofore been required in marking and punching holes in the damper and clip, through which the rivets are to pass, and inserting such rivets and upsetting the ends thereof.

What we claim as our invention, and desire to secure by Letters Patent of the United States, is:

1. A damper clip comprising a sheet metal plate, a pair of ears on the outer edge of said plate adapted to engage the edge of the damper, a point on the inner end of said plate adapted to be driven through the damper, a longitudinal bent up integral portion, a handle arranged longitudinally within and between the bent up portion and the damper, and an integral shoulder on the outer edge of the plate and extending on both sides of the damper.

2. In a device of the character described, the combination with the damper, of a damper clip comprising a sheet metal plate, a pair of ears on the outer edge thereof adapted to engage the edge of the damper, a point on the end of the plate adapted to be inserted in said damper, a central longitudinal bent up member formed on the plate integral therewith, a handle arranged longitudinally within and between the bent up portion and the damper, and a circular shoulder integral with the outer edge of the plate extending on opposite sides of the damper, the portion of the shoulder on one side only of the damper being integrally connected with the plate, and ears or keepers formed integral with the plate and frictionally engaging opposite sides of the handle.

In testimony whereof, we affix our signatures, in presence of two witnesses.

JOHN C. MEISTER.
JOHN A. COCHRAN.

Witnesses:
A. K. HABERER,
C. H. WOODBURN.